June 25, 1968  C. P. MAJKRZAK  3,389,868
DEVICE FOR COILED STOWAGE OF CABLES
Filed Sept. 8, 1966  4 Sheets-Sheet 1
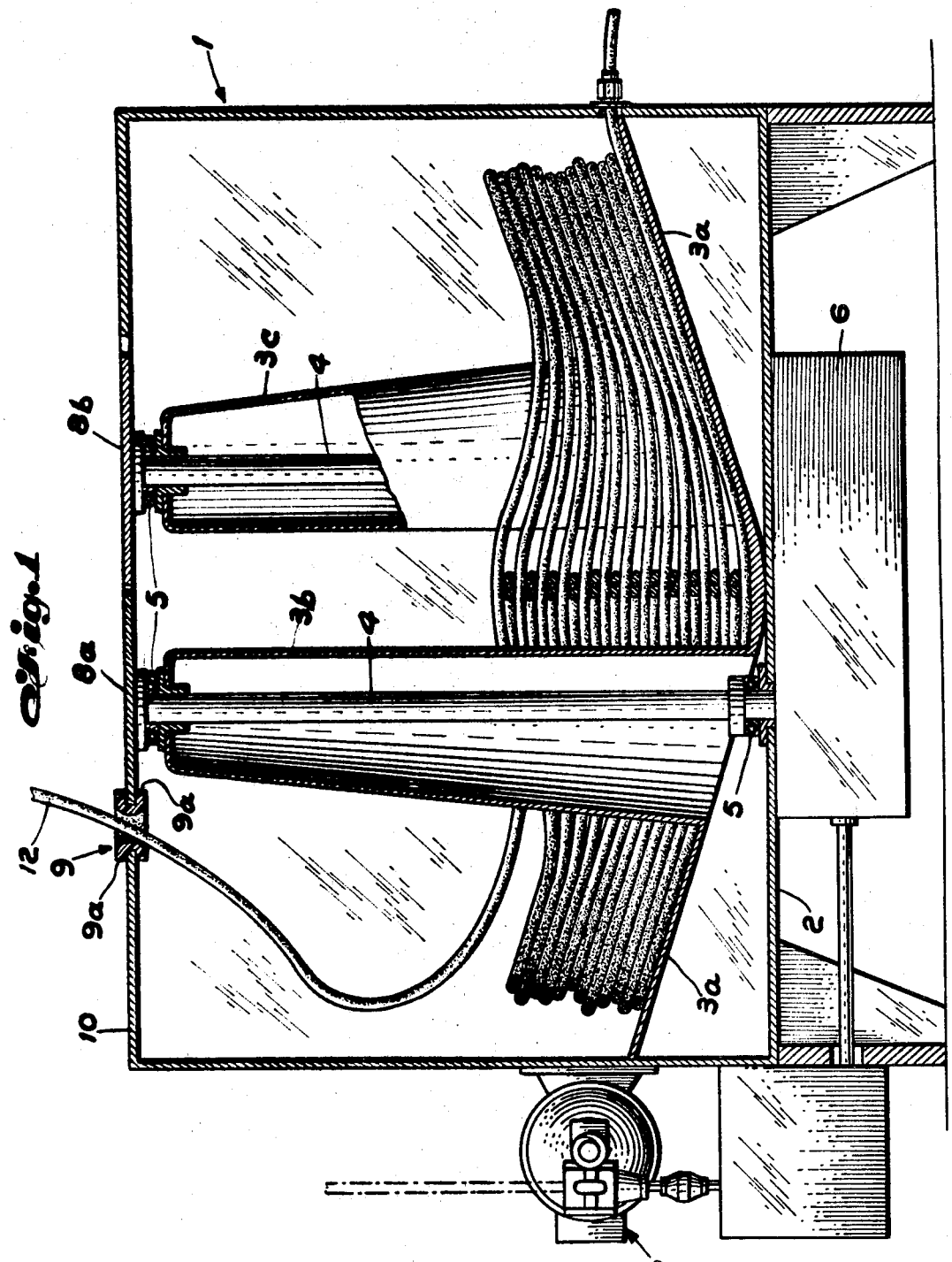
INVENTOR.
CHARLES P. MAJKRZAK
BY
Bernard J. Murphy
AGENT

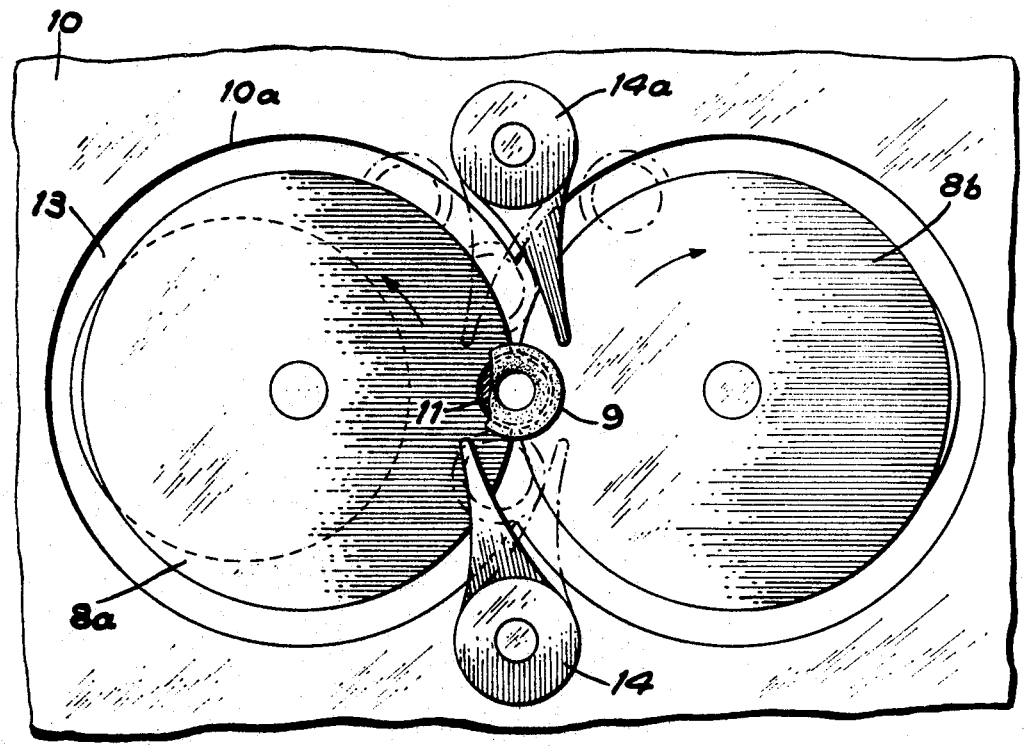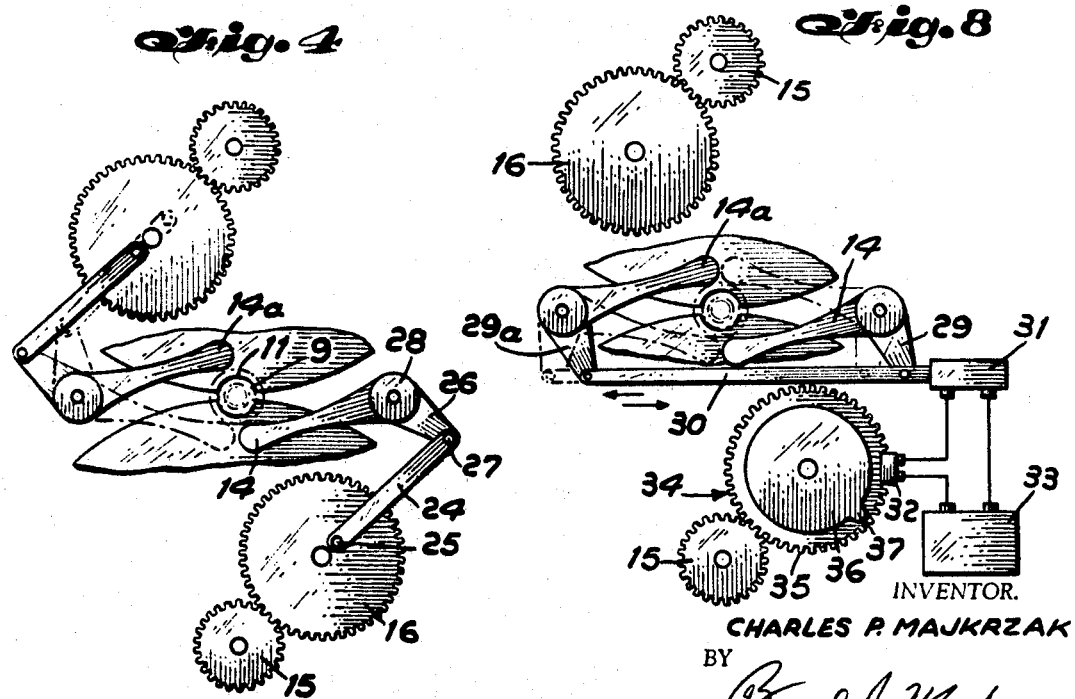

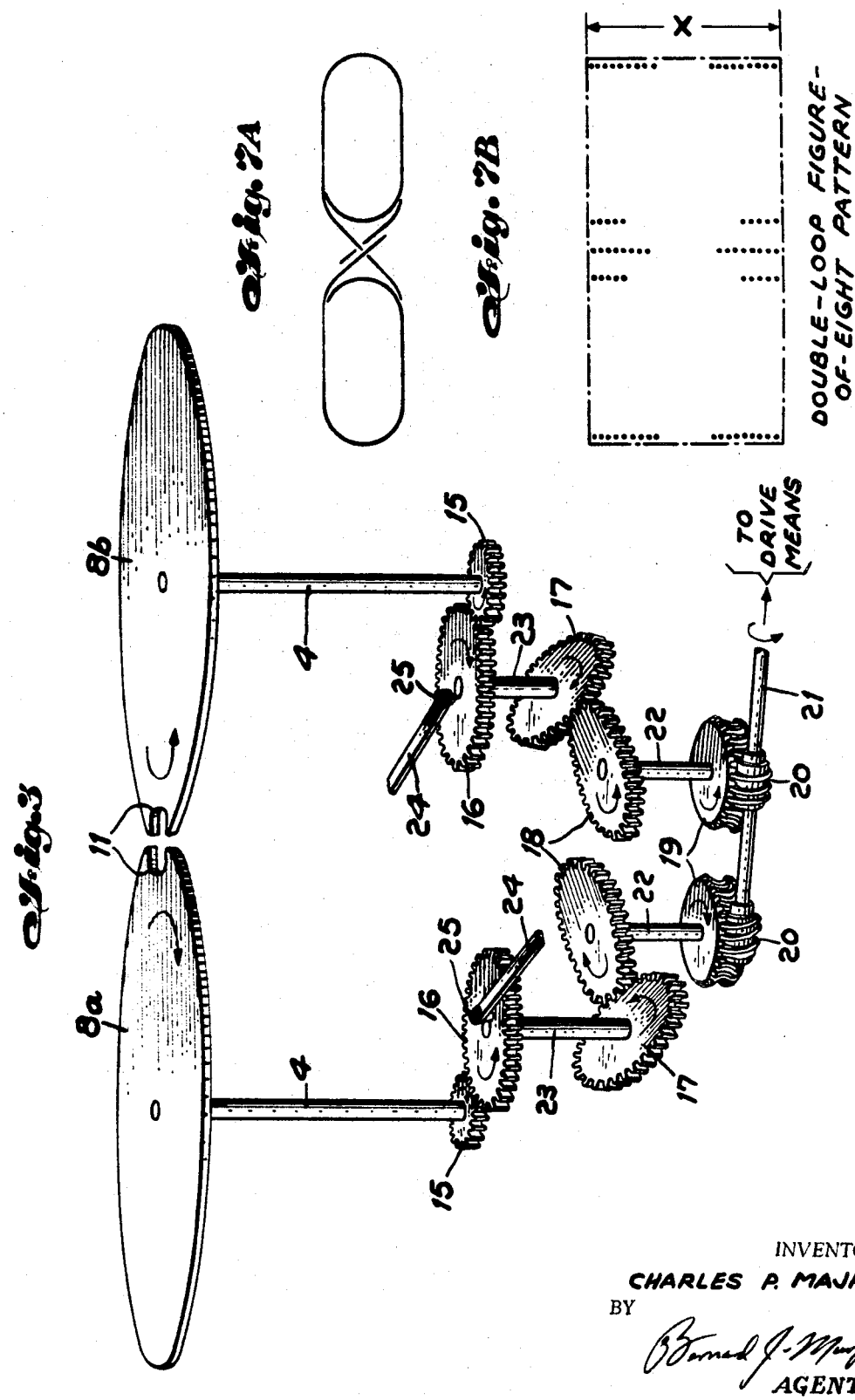

June 25, 1968  C. P. MAJKRZAK  3,389,868

DEVICE FOR COILED STOWAGE OF CABLES

Filed Sept. 8, 1966  4 Sheets-Sheet 4

SINGLE-LOOP FIGURE
OF-EIGHT PATTERN

INVENTOR.
CHARLES P. MAJKRZAK
BY
Bernard J. Murphy
AGENT ns Patent Office 3,389,868
Patented June 25, 1968

1

3,389,868
DEVICE FOR COILED STOWAGE OF CABLES
Charles P. Majkrzak, Nutley, N.J., assignor to International Telephone and Telegraph Corporation, a corporation of Delaware
Filed Sept. 8, 1966, Ser. No. 578,077
11 Claims. (Cl. 242—54)

ABSTRACT OF THE DISCLOSURE

Wire or cable is wound in a figure eight pattern for stowage in a housing by two rotatable disks which alternately carry a guide within channels around the disks in the desired pattern. Deflectors coupled to the disk driving mechanism control the alternating movement of the guide.

---

This invention relates to devices for the coiled stowage of filamentary materials, such as thread, wire, cord, rope, or cable, and in particular to a device for the coiled stowage of electrical cable.

Known devices for the coiled stowage of cables use single reels or drums, which may be fixed or driven with means to wind the cable thereabout. When used with an electrical cable in a partially-released cable system (that is, a system where a partial length of the cable is released for use and the remainder stays in coiled stowage), these known devices evidence certain limitations. In such systems the remaining coiled cable picks up, by inductive effect, stray noises and induced voltages from electrical machinery in areas proximate to the stowage device; especially is this so where unshielded cable, such as Military Specification Type RG-298/U, or equivalents, must be used in these partially-released cable systems. Also, the known devices require an area of considerable vertical height for the stowage of a mass of cable.

It is an object of the present invention to provide a device for the stowage of electrical cable providing for the stowage thereof in a counter-inductive pattern.

Another object of the present invention is to provide a device for the stowage of a considerable quantity of cable in a stowage space having a minimal depth.

A feature of this invention is the provision of means whereby a cable may be coiled and stowed in a figure-of-8 pattern.

Figure 5:
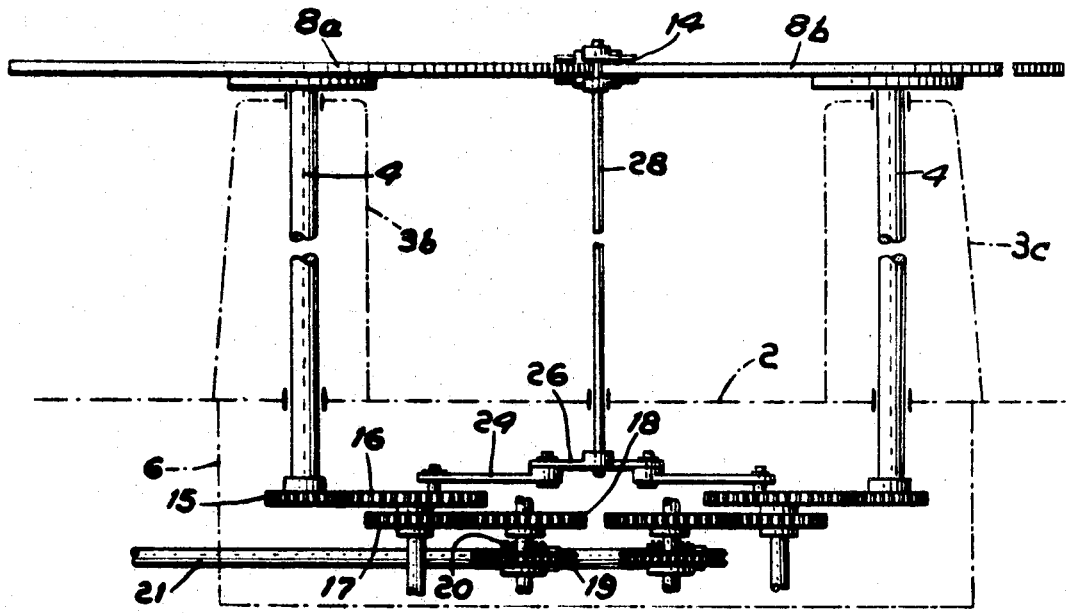
Figure 6A:
Figure 6B:
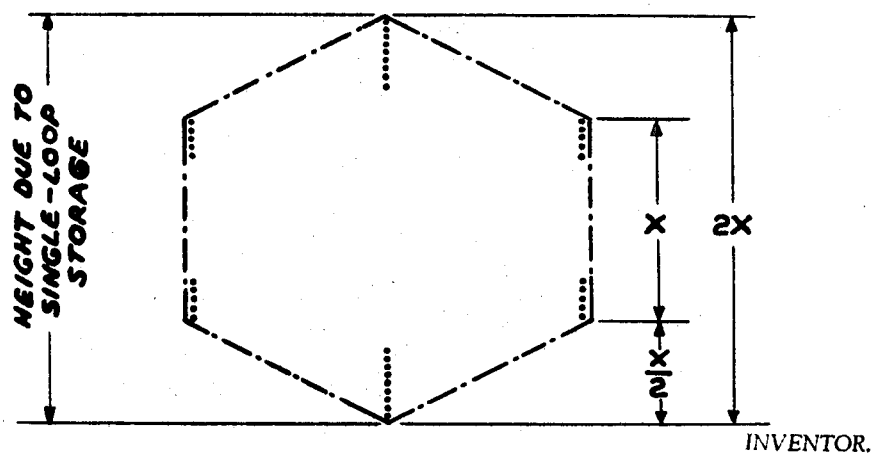

The above mentioned and other features of this invention will become more apparent by reference to the following description taken in conjunction with the accompanying drawings, in which:

FIG. 1 is an elevation and cross-sectional view of an embodiment of the invention;
FIG. 2 is top view of the embodiment of FIG. 1;
FIG. 3 represents the gear gox driving system in isometric view;
FIG. 4 presents a plan view of the gearing and linkages;
FIG. 5 represents a side view of the gear train and linkage arrangement;
FIGS. 6A and 6B represent a single loop in plan view and an elevation outline of cable stowed in a single-loop figure-of-eight pattern, respectively;
FIGS. 7A and 7B represent a double loop in plan view and an elevation outline of cable stowed in a double-loop figure-of-eight pattern, respectively; and
FIG. 8 shows a detailed plan view of a different embodiment of the invention which effects cable stowage according to the outline of FIGS. 7A and 7B.

In FIGURE 1 is shown the stowage container 1 having base 2. Vertical drums 3b and 3c are affixed to a common, dihedral skirt 3a which overlies base 2. Vertical shafts 4 extend through the drums and are mounted at the upper ends thereof in the drums and at the lower ends thereof in the base by bearing assemblies 5. The lower ends of the vertical shafts are received in gear box 6 to which an external drive is provided by drive means 7. The upper ends of vertical shafts 4 mount disks 8a and 8b. Disk 8a has a grommet 9 positioned against an edge thereof. It should be noted that for clarification grommet 9 has been displaced in FIG. 1 to the left side of disk 8a. The stowage container 1 has a top plate 10. In FIG. 2 it is seen that the top plate 10 has a figure-of-8 cutout portion 10a. Each half of the figure is a circle concentric with the disk 8a or 8b. Grommet 9 is receivable in semi-circular notches 11 formed on one edge of each disk, and cable 12 passes through the center of grommet 9. Disk 8a is shown with half of the grommet cut away. Between disks 8a and 8b and cutout portion 10a is defined a channel 13 in the form of a figure-of-8. Deflectors 14 and 14a are mounted across the figure-of-8 pattern of the channel 13, adjacent the juncture of the loops. FIGURE 2 also shows the sequence whereby grommet 9 travels in channel 13, being carried by each disk 8a or 8b in the notch 11 and passing between deflectors 14 and 14a to traverse both loops of the figure-8. As shown by the arrows, the directions of rotation of the disks 8a and 8b are in opposite senses. Grommet 9 will be carried by disk 8a because deflector 14a will prevent movement thereof in the opposite direction. In FIG. 3 there are shown disks 8a and 8b, with notches 11 formed therein, mounted on vertical shafts 4. Each shaft terminates in a driven spur gear 15 which mates with a driving spur gear 16. Driven elliptical gears 17 impart rotation to driving spur gears 16 as received from mating driving elliptical gears 18. Each driving elliptical gear 18 is coupled to a worm gear 19 which is driven by a worm 20. Worm 20 is mounted on a drive shaft 21 which is coupled to the drive means 7. Shafts 22 and 23 couple the spur gears 16 and elliptical gears 17 and 18 and the worm gear 19. FIG. 4 shows a portion of the gear train as presented in FIG. 3 with a further illustration of the actuating means for deflectors 14 and 14a. One end of reciprocating link 24 is pivotally secured to driving spur gear 16, being pinned thereto offset from the center thereof at 25. The opposite end of the link 24 is pivotally joined to an end of driven crank 26 by pivot pin 27. The other end of driven crank 26 is keyed to deflector drive shaft 28. In FIG. 5 the deflector drive shaft 28 is shown joined to the deflector 14 at the top and driven crank 26 at the bottom. FIG. 5 also illustrates the containment of the gear train and linkages within gear box 6 beneath base 2.

In operation, as can be seen by reference to FIGS. 1 and 2, cable 12 can be fed in or payed out through grommet 9 into or from stowage container 1. Grommet 9 has radial shoulders 9a which overlie edges of the disk 8a and 8b. The axial center portion of grommet 9, between the shoulders 9a, is mounted within at least one of said notches 11; when the notches 11 of the disks 8a and 8b are adjacent as shown in FIG. 2 then the grommet 9 fits into both notches. Drive for the disks is imparted through vertical shafts 4 causing the grommet 9 to be carried in alternate cyclic travel about the axes of the drums 3. The grommet 9 is carried alternately by each disk 8a and 8b within the channel 13. On reaching the junction of the loops of the figure-of-8 of the channel, grommet 9 is deflected to the opposite loop of the figure-of-8 by deflectors 14 and 14a.

The operation whereby the grommet (passing the cable therethrough) is orbited first about the axis of one of the drums, and then orbited about the axis of the other drum is illustrated in FIGS. 2, 3 and 4. It is seen that the deflectors 14 and 14a alternately pivot between two different, complementary dispositions with each revolution of the disks 8a and 8b and driven spur gears 15. Driven spur gears 15 and disks 8a and 8b are rotated in common within a given range of speed. Driving spur gears 16 rotate at half the speed of driven spur gears 15 and disks 8. Thus, as the grommet 9 approaches the juncture of the figure-of-8 pattern of channel 13 the deflectors 14 and 14a are arranged to accommodate the passage of the grommet 9 therebetween and into the complementary loop of the figure-of-8 pattern. FIGS. 4 and 5 graphically illustrate that the reciprocating alteration of the position of the deflectors 14 and 14a is synchronized with the drive of the disks 8. Elliptical gears 18 and 19 (FIG. 3) are provided to cause a varying velocity in the rotation of the disks 8. This varying velocity is necessary as the cable 12 is required to traverse a greater distance between the loops of the figure-of-8 than at the arcuate ends of the figure-of-8, assuming a constant speed in cable feed or pay-out. Elliptical gears 17 and 18 translate the constant drive from drive means 7 from an accelerated velocity of disks 8 when the notches 11 are in tangency (FIG. 2) to a decelerated velocity as the notches 11 separate. When the notches are furthest apart the accelerations are reversed.

In the manner described, cable 12 is disposed within container 1 in a figure-of-8 pattern. This pattern causes cancellation of currents produced in each of the opposed loops and effectively minimizes or eliminates the pick-up and amplification of extraneous electrical signals. In view of this opposed loop cancellation of induced currents, exterior shielding such as provided by storage container 1 becomes less important.

As can be seen in FIGS. 6A and 6B, cable stowage in a single-loop pattern realizes a height of X, in the container (1, FIG. 1), where the opposed loop ends lie in stacked relationship. A cable stowage height of 2X results in the center of the container. Thus, according to an embodiment of the invention, a dihedral skirt (3a, FIG. 1) is provided to raise the loop ends a height of X/2 from the base (2, FIG. 1) whereby disparity in cable height stowage is divided top and bottom.

According to another embodiment of the invention, cable is stowed in a double-loop figure-of-eight pattern, according to the stowage pattern shown in FIGS. 7A and 7B. This stowage pattern makes the use of a dihedral skirt unnecessary, and makes more efficient use of the stowage container. Perhaps most significant is the fact that for a given amount of cable stowed in single-loop figure-of-eight pattern, the stowage container requires 100% more cable-accommodating height than is required for cable stowed in a double-loop figure-of-eight.

A rather simple modification of the gearing and linkages (of FIG. 4) shown in FIG. 8, provides for double looping of the stowed cable. According to this other embodiment, the deflectors 14 and 14a have crank arms 29 and 29a, respectively, extending therefrom. A link 30 is pivotably coupled at the ends thereof to the crank arms. Link 30 is also pivotally coupled to the actuating arm of double-acting solenoid 31. Solenoid 31 is electrically coupled in series with a cam-actuated switch 32, both said solenoid 31 and switch 32 being supplied electrical power from a source 33. Where in FIG. 4 the driving spur gear 16 was shown as simple gear, in this embodiment of the invention, the driving gear 34 is both a spur gear 35 and a cam wheel 36. The cam wheel 36 is coaxial with and securely surmounted on the spur gear 35, and has a cam 37 formed on the periphery thereof. In this embodiment, the deflectors 14 and 14a require no duplication of drives and linkages (as is the case in the first embodiment, according to FIG. 4). Here, deflectors 14 are slewed from a first position to the alternate position, by means of solenoid 31, and link 30 causing deflector 14a to slew to its complementary position. Driving spur gear 16 and driving gear 34 are each coupled to driven elliptical gears (17, FIG. 3) from which rotation is imparted. As described previously, driving spur gear 16 and driving gear 34 rotate driven spur gears 15 (which rotate the disks 8a and 8b, FIG. 3). Driven spur gears 15 rotate at the same rate of speed as the disks to which they are coupled; this is twice the revolution rate of gears 16 and 34. Thus, cam wheel 36 makes one full revolution for every two revolutions of gears 15 (and the disks). With each revolution of cam wheel 36, cam 37 actuates switch 32 causing solenoid 31 to be actuated to its alternate condition. As depicted in FIG. 8, the actuating arm of solenoid 31 is fully retracted, and deflectors 14 and 14a are held in the disposition shown. Each time that cam 37 actuates switch 32, solenoid 31 reciprocates link 30, and the deflectors 14, 14a are slewed to and held at their alternate positions. This novel arrangement causes the grommet (9, FIG. 2) to make two orbits above a drum before the deflectors are switched to accommodate transfer of the grommet for orbiting above the other drum. Thus, the cable being payed in (or out) is caused to conform to a double-looped figure-of-eight pattern.

While the embodiment of FIG. 8 is illustrated with an electrical sequence control it should be understood that a mechanical sequence control could also be used.

While I have described above the principles of my invention in connection with specific apparatus it is to be clearly understood that this description is made only by way of example and not as a limitation to the scope of my invention, as set forth in the objects thereof and in the accompanying claims.

I claim:

1. A stowage device for filamentary material comprising: first and second rotatable members disposed adjacent one another; means driving said rotatable members in a cooperative relationship; guide means coupled alternately to each of said rotatable members to rotate therewith and guide said filamentary material; and means connected to said driving means for controlling the coupling of said guide means alternately to said rotatable members to wind said filamentary material about said members in a figure-of-eight pattern.

2. A stowage device according to claim 1 wherein said filamentary material comprises an electrical cable and the figure-of-eight pattern effects cancellation of stray electrical signals and noise induced in said cable.

3. A stowage device according to claim 1 wherein said means for controlling the coupling of said guide means includes means causing said guide means to rotate alternately about each rotatable member more than one revolution to control the number of loops for each half of the figure-of-eight pattern.

4. A stowage device according to claim 1 further comprising a housing, means disposing said first and second rotatable members and said guide means within said housing, said rotatable members comprising a disk and a drive shaft and means coupling said disk to said shaft, each said disk having a semicircular notch on the outer edge thereof, said housing having a top flat member coplanar with said first and second disks, said disks being disposed adjacent each other and freely rotatable with respect to each other, a figure-of-eight cutout in said flat member, each half of said figure-of-eight cutout being coaxial with each of said disks and forming a spaced channel between said flat member and disks in the form of a figure-of-eight, said guide means comprising a grommet receivable in each said notch and overlying the edge of said notch and said figure-of-eight channel, said grommet including an opening through which said filamentary material is fed into said housing, and wherein said means for controlling the coupling includes deflector means cooperating with said grommet to alternately guide said grommet and filamentary material within said channel around each rotatable member in said figure-of-eight stowage pattern.

5. A stowage device according to claim 4 wherein said deflector means comprises first and second deflector members, each said deflector member being disposed at different portions across the path of said grommet between both halves of said figure-of-eight channel and adapted to rotate through an arc equal to the diameter of said grommet to urge said grommet along the desired circular path.

6. A stowage device according to claim 5 wherein: said driving means causes said rotatable members to turn in counter-rotating directions.

7. A stowage device according to claim 5 wherein: said driving means include crank means coupled to said deflector members to cause on deflector to pivot to a given position blocking one-half of said channel and the other deflector to pivot toward an opposite position blocking the other half of said channel so as to guide said grommet therebetween.

8. A stowage device according to claim 7 wherein: said crank means cause said deflector members to pivot through said arc once for each successive revolution of said rotatable members.

9. A stowage device according to claim 4 wherein: said disks are coupled to their respective drive shafts so that said notches meet and form a circular opening receiving said grommet therebetween with each revolution of said rotatable members.

10. A stowage device according to claim 9 wherein: said grommet has radial shoulders on opposing ends thereof with a cylindrical shank portion therebetween, said shank portion having a diameter of substantially the same dimension as said circular opening, and said grommet is positioned in at least one of said notches and in said channel so that said shoulders receive said one notch and said cut-out portion therebetween.

11. A stowage device according to claim 5 wherein: said filamentary material comprises electrical cable; and said drive means causes said deflector members to rotate through said arc once for every two revolutions of said rotatable members.

References Cited

UNITED STATES PATENTS 3,056,433   10/1962   Haugwitz _____ 242—82 X

OTHER REFERENCES

Harms, German printed App. No. 1,113,166, pub. Aug. 24, 1961.

WILLIAM S. BURDEN, *Primary Examiner.*